Feb. 13, 1934.                H. L. STRONGSON                    1,946,770
                         METHOD OF MAKING CORED HEELS
                    Filed March 14, 1929            2 Sheets-Sheet 1

INVENTOR
Herman L. Strongson
By his Attorney
Nelson K. Howard

Feb. 13, 1934.     H. L. STRONGSON     1,946,770
METHOD OF MAKING CORED HEELS
Filed March 14, 1929     2 Sheets-Sheet 2

Patented Feb. 13, 1934

1,946,770

UNITED STATES PATENT OFFICE 1,946,770

METHOD OF MAKING CORED HEELS

Herman L. Strongson, New York, N. Y., assignor to United Shoe Machinery Corporation, Paterson, N. J., a corporation of New Jersey Application March 14, 1929. Serial No. 347,116

5 Claims. (Cl. 18—59)

This invention relates to methods of making cored heels and is herein exemplified as applied to the manufacture of a molded heel having a core of wood or similar light material into which nails may readily be driven.

It is an object of the invention to provide an improved method of manufacture whereby cored heels of a high degree of uniformity and perfection may be produced with a minimum amount of labor and complicated machinery and, consequently, at low cost.

With the foregoing in view an important feature of the invention comprises a method including making a heel core by forming a blank as a solid of revolution, as for example, by a simple turning operation in a lathe, and then cutting away a portion at one side of the blank to produce a flat face thereon.

Preferably, when a high, tapered heel is to be made, the core blank or block is turned to a generally tapered shape in order that it may occupy a large part of the volume of the heel and, the larger end of the core being disposed at the attaching face of the heel, a relatively large area may be provided for the reception of heel attaching nails. When, however, a relatively low, straight heel is to be made the core need not be so tapered.

The cutting away of a portion at one side of the blank to produce a flat face thereon may be quickly effected by a simple sawing or slicing operation, making a single, flat cut.

The core, ready for embodiment in a heel, thus may be easily produced by one turning operation and one flat cutting operation, requiring only the simplest and most common wood working machine, with a resultant high degree of economy in cost of production.

Another feature of the invention, relating to the manufacture of a cored heel, consists in providing a core longer than the height of the desired heel, holding the core by its ends, molding a heel-shaped covering about the intermediate portion of the core, and cutting off the ends of the core flush with the tread and attaching faces of the heel. In the case where the core is turned to a generally tapered shape the moldable material will preferably be so formed about the intermediate portion of the core that the larger end of the core will be disposed at the attaching face of the heel and the smaller end of the core will be at the tread face. In one of the forms of cored heels illustrated herein the flat surface at one side of the core blank extends for only part of the length of the blank at the smaller end thereof so that in the completed heel the exposed core at the tread face has a D-shaped cross section, affording a maximum nailing area for the attachment of a top lift, while in another illustrated form of heel the flat face extends the full length of the core which presents D-shaped nailing surfaces at both ends of the heel.

While the heel-shaped covering may consist of any suitable modable material, I prefer to employ one of the well known phenolic condensation products, of which Bakelite is a typical example.

In the operation of molding the heel-shaped covering about the intermediate portion of the core the said covering may be permanently secured to the core and after the heel is completed by the removal of the projecting ends of the core the core and covering will be, in effect, integral.

For a clearer understanding of the details of the invention and appreciation of the benefits afforded by it, reference may be had to the following specification, to be read in connection with the accompanying drawings, in which Fig. 1 is a view in side elevation of a turned core blank before the flat cut has been made at its side;

Figure 1:
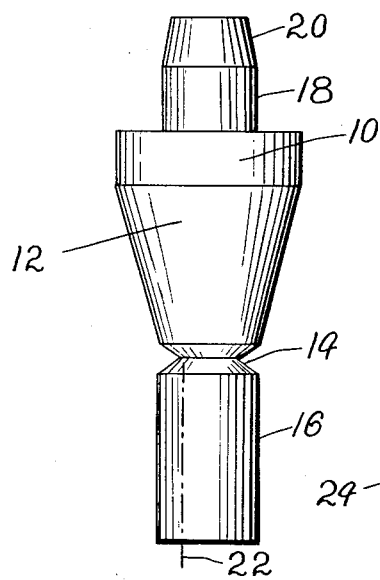

In Fig. 1 is shown a core blank of circular cross section which may be turned from a block of wood or other suitable material in an ordinary wood turning lathe. It will be recognized that the formation of the core blank as a simple solid of revolution constitutes the easiest and cheapest practicable method of making a core of a shape suitable for use in a heel.

As shown, a plain cylindrical end portion 10 is provided and adjacent thereto, a tapering, or conical, portion 12. At the lower end of the conical portion is a groove 14 providing a section of reduced cross sectional area. A plain cylindrical portion 16 extends downward from the groove 14. Also, a plain cylindrical projection 18 is formed at the upper end and, if desired, a tapered portion 20, which may serve to guide the core into a socket in a heel mold.

A portion of the cylindrical part 16 is removed by sawing or slicing along a line 22 which extends to the groove 14, forming a flat face 24 at one side of the blank for part of its length and producing a D-shaped end 26 which will conform approximately to the shape of the tread face of a shoe heel.

Figure 3:
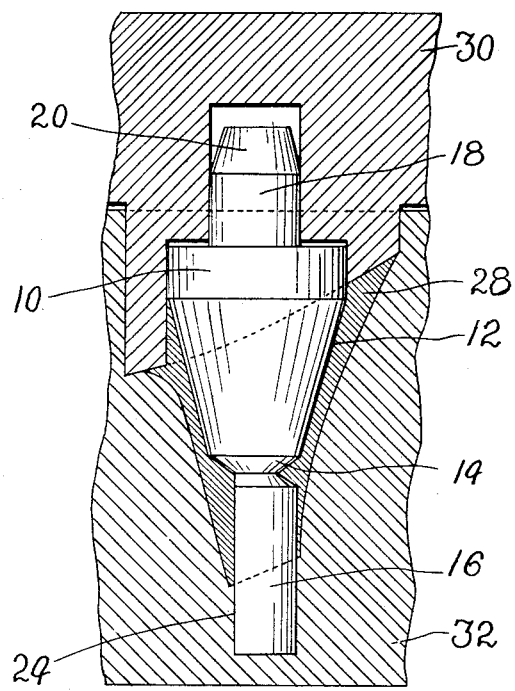
Fig. 3 illustrates the step of molding the heel covering material about the core.

The next step in making the heel consists in supporting or holding the core by its end portions 16, 18 while a heel-shaped covering 28 is molded around the intermediate, tapered portion of the core and permanently secured thereto. This may be effectively accomplished by providing a mold consisting of upper and lower sections 30 and 32 containing a cavity of the size and shape of the desired heel and sockets constructed and arranged to receive and hold rigidly the projections 18, 16 while the heel is being molded. As shown in Fig. 3 the lower, flattened projection 16 may be inserted in the socket in the lower mold section 32 to locate the core with respect to the heel cavity in the mold and support the core and prevent it from turning while the proper quantity of moldable composition to form the covering 28 is placed in the mold around the core. A preferred material for this purpose is a phenolic condensation product in powdered form since this material, when cured, is strong and tough, will stand considerable abuse without being broken or marred and, in a polished mold, will provide a beautiful, hard brilliant surface which is very pleasing in appearance. The present method, however, is equally applicable to the use of other suitable moldable materials and the invention is not limited to the utilization of a phenolic condensation product for the heel covering 28. The core blank and the moldable material having been placed in the lower mold section 32, the upper mold section 30 is placed in position and molding pressure is applied, accompanied by heat if required to cure the molded material.

Figure 4:
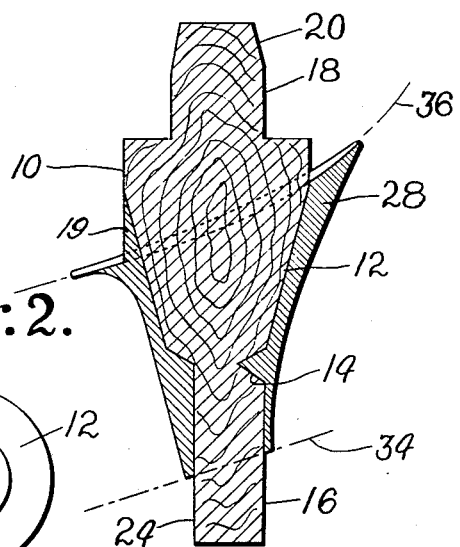
Fig. 4 is a vertical sectional view of the product of the molding step illustrated in Fig. 3.
Figure 2:
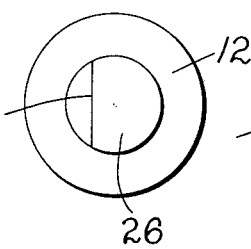
Fig. 2 is a bottom plan view of the blank after the flat cut has been made.
Figure 5:
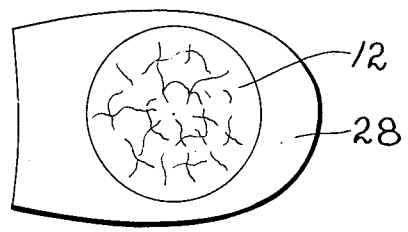
Fig. 5 is a plan view showing the attaching face of the completed heel.
Figure 6:
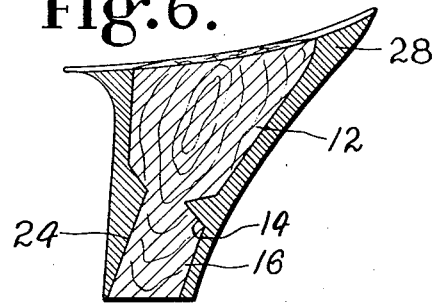
Fig. 6 is a vertical sectional view of the completed heel.
Figure 7:
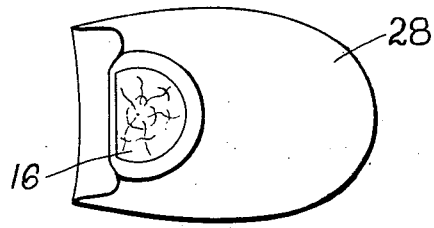
Fig. 7 is an inverted plan view showing the tread face of the completed heel.

After completion of the molding operation the article is removed from the mold and is in the condition represented in Fig. 4, the opposite end portions of the covering having been shaped by the molding operation to constitute the outer portions of the tread and attaching faces of a heel and the end portions 16, 18, of the core by which the core was held during the molding operation, projecting beyond the shaped ends of the covering material. A thin lip 19 also projects from the covering material and overlies the projecting part of the conical portion 12 of the core at the upper or attaching face end of the article. In order to complete the heel these projecting end portions 16 and 18 of the core and the lip 19 of the covering material are cut off along paths indicated by the dotted lines 34, 36 so as to be flush with the respective shaped end portions of the covering which serve as gage faces to guide the cutting means along paths indicated by the dotted lines 34, 36. The heel then appears as shown in Figs. 5, 6 and 7. A large, approximately circular area of the portion 12 of the core is exposed at the attaching face of the heel, affording anchorage for the heel attaching nails, which may be driven from the inside of the shoe into the heel, as is customary with heels of the style illustrated, and a D-shaped area of the core material extending over a maximum part of the tread face of the heel is exposed at said face for the reception of top lift attaching nails.

The groove 14 in addition to affording a limit for the depth of the saw cut which is made to form the flat face 24, provides for locking the molded cover 28 securely and permanently to the core, eliminating any possibility of separation and making the core and cover virtually integral.

Figure 10:
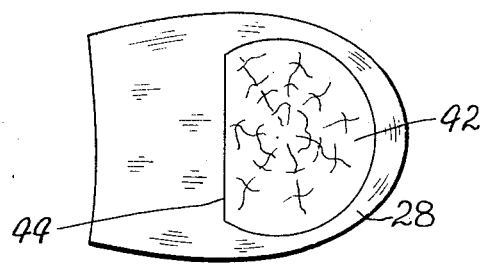
Fig. 10 is a plan view of a heel embodying the core shown in Fig. 9.
Figure 8:
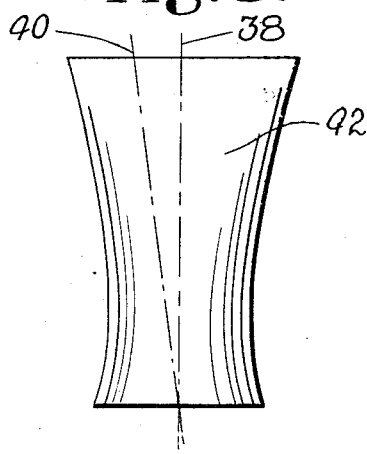
Fig. 8 is a view in side elevation of a modified form of turned core blank.
Figure 11:
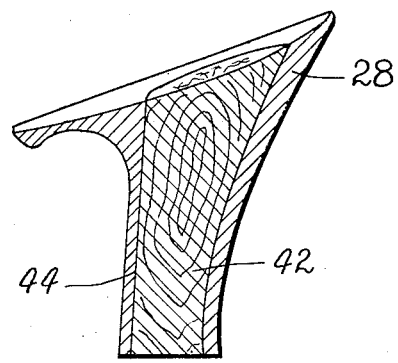
Fig. 11 is a vertical, sectional view of the completed heel shown in Fig. 10.
Figure 9:
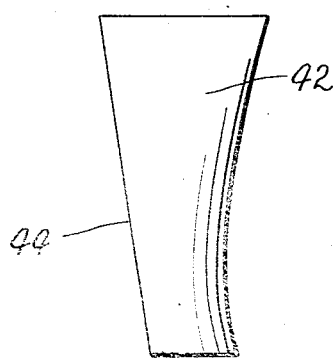
Fig. 9 is a view in side elevation of the same blank after the flat cut has been made.

In the modified form of the invention illustrated in Figs. 8 to 11, inclusive, the portion of the core blank about which the covering material is to be molded is turned to the shape shown most clearly in Fig. 8, i. e., in general it is tapered but is slightly enlarged at its lower end. This core blank is also formed as a solid of revolution about the axis 38 and when a flat cut is made along the line 40 a core blank such as that illustrated in Fig. 9 is produced, said blank being designated by 42 and having a flat face 44. When a heel is completed about a core of this type, by the method described above, the portion of the core which is exposed at the attaching face of the heel will be approximately D-shaped, as shown in Fig. 10, instead of approximately circular, as shown in Fig. 5, but will be considerably larger than the D-shaped, exposed portion of core material at the tread face of the heel.

Having described the invention, what is claimed as new and desired to be secured by Letters Patent is:—

1. The method of making a cored heel which consists in providing a core longer than the height of the desired heel, holding the core by its ends, molding a heel shaped covering about the intermediate portion of the core while the core is thus held, and cutting off the ends of the core flush with the tread and attaching faces of the heel.

2. The method of making a cored heel which consists in providing a core longer than the height of the desired heel, utilizing one end portion of the core to support the core and position it relatively to a mold member, molding and curing a heel shaped covering of a phenolic condensation product about another portion of the core while the core is thus supported and positioned, and removing said end portions of the core.

3. The method of making a cored heel which consists in turning a block of wood to a generally tapered shape of circular cross section, flattening the side of the smaller end of the turned block, and molding a heel shaped covering about the block in such a manner that the larger end of the block is exposed at the attaching face of the heel and the smaller flattened end of the block is exposed at the tread face.

4. The method of making a cored heel which consists in providing a generally tapered core longer than the height of the desired heel, holding the core by its ends, molding a heel shaped covering about, and permanently securing said covering to, the intermediate portion of the core in such a manner that the larger and smaller ends of the core project respectively from the attaching and tread faces of the heel, and thereafter cutting off the projecting ends of the core flush with said faces of the heel.

5. The method of making a cored heel which consists in providing a generally tapered core longer than the height of the desired heel, holding the core by its ends, molding a heel-shaped covering about the intermediate portion of the core in such a manner that the smaller end of the core projects from the tread face of the heel and part of the tapered portion at the larger end of the core projects from the attaching face of the heel and is overlapped by said covering, and thereafter cutting off the projecting ends of the core and said overlapping portion of the covering flush with the respective faces of the heel.

HERMAN L. STRONGSON.